(12) United States Patent
Ohara et al.

(10) Patent No.: US 11,034,855 B2
(45) Date of Patent: Jun. 15, 2021

(54) CATIONIC ELECTRODEPOSITION COATING MATERIAL COMPOSITION

(71) Applicant: NIPPON PAINT AUTOMOTIVE COATINGS CO., LTD., Osaka (JP)

(72) Inventors: Tetsuya Ohara, Hirakata (JP); Nobuhiro Miyamae, Hirakata (JP); Yosuke Shimodaira, Hirakata (JP); Toshio Inbe, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 42 days.

(21) Appl. No.: 16/495,867

(22) PCT Filed: Mar. 22, 2018

(86) PCT No.: PCT/JP2018/011315
§ 371 (c)(1),
(2) Date: Sep. 20, 2019

(87) PCT Pub. No.: WO2018/174134
PCT Pub. Date: Sep. 27, 2018

(65) Prior Publication Data
US 2020/0102469 A1 Apr. 2, 2020

(30) Foreign Application Priority Data

Mar. 23, 2017 (JP) .............................. JP2017-057927

(51) Int. Cl.
| | | |
|---|---|---|
| *C09D 163/00* | (2006.01) | |
| *C09D 5/02* | (2006.01) | |
| *C09D 5/08* | (2006.01) | |
| *C09D 5/44* | (2006.01) | |
| *B05D 1/18* | (2006.01) | |
| *B05D 3/02* | (2006.01) | |
| *C08K 5/21* | (2006.01) | |
| *C25D 13/06* | (2006.01) | |
| *C09D 7/61* | (2018.01) | |
| *C08K 5/00* | (2006.01) | |
| *C08K 3/08* | (2006.01) | |

(52) U.S. Cl.
CPC .............. *C09D 163/00* (2013.01); *C08K 5/21* (2013.01); *C09D 5/022* (2013.01); *C09D 7/61* (2018.01); *C25D 13/06* (2013.01); *C08K 5/0025* (2013.01); *C08K 2003/0837* (2013.01); *C08K 2003/0893* (2013.01)

(58) Field of Classification Search
None
See application file for complete search history.

(56) References Cited

U.S. PATENT DOCUMENTS

2011/0062026 A1* 3/2011 Nishiguchi .......... C09D 5/4492
205/50

FOREIGN PATENT DOCUMENTS

| GB | 2 296 204 | 6/1996 | |
|---|---|---|---|
| JP | 6-65790 | 3/1994 | |
| JP | 8-170035 | 7/1996 | |
| JP | 2010-144104 | 7/2010 | |
| JP | 2014-172944 | 9/2014 | |
| JP | 2015218348 A | * 12/2015 | ........... C09D 163/00 |
| JP | 2018159032 A | * 10/2018 | ............. C08G 18/00 |

OTHER PUBLICATIONS

Machine translation of JP-2015218348-A (no date).*
Abstract of JP-2018159032-A (no date).*
International Preliminary Report on Patentability dated Oct. 3, 2019 in International Application No. PCT/JP2018/011315.
International Search Report dated Jun. 26, 2018 in International Application No. PCT/JP2018/011315.

* cited by examiner

*Primary Examiner* — Michael J Feely
(74) *Attorney, Agent, or Firm* — Wenderoth, Lind & Ponack, L.L.P.

(57) ABSTRACT

The present invention relates to a cationic electrodeposition coating composition containing a resin emulsion containing an aminated resin (A) and a blocked isocyanate curing agent (B), characterized in that a deposited electrodeposition coating film of the cationic electrodeposition coating composition has a coating film viscosity in a range of 5,000 to 1,000,000 mPa·s at 110° C., and a portion resulting from removal of a resin component from the deposited electrodeposition coating film of the cationic electrodeposition coating composition has a polarity term in a range of 2 to 30 mN/m.

8 Claims, No Drawings

CATIONIC ELECTRODEPOSITION COATING MATERIAL COMPOSITION

TECHNICAL FIELD

The present invention relates to a cationic electrodeposition coating composition superior in rust prevention property.

BACKGROUND ART

On a surface of an object to be coated such as a metal substrate, a plurality of coating films having various roles are formed, and the coating films protect the object to be coated and, at the same time, impart beautiful appearance. Commonly, as a coating film for imparting corrosion resistance to an object to be coated, electrodeposition coating films formed by electrodeposition coating have widely been used. Electrodeposition coating has widely been used as an under coating method particularly for objects to be coated having a large and complicated shape such as vehicle bodies because coating can thereby be applied in detailed portions of an object even if the object has a complicated shape and the coating can be provided automatically and continuously. As such electrodeposition coating, electrodeposition coating using a cationic electrodeposition coating composition has widely been used.

A coating film is required to impart corrosion resistance to an object to be coated and is also required to have good surface condition. One of possible means for improving the surface condition of a coating film is a method of improving a leveling property of the coating film during the formation of the coating film. For example, it is possible to improve the surface condition of a coating film by leveling the coating film through heat flow during curing such as heating. On the other hand, when an object to be coated has an edge part, it is difficult to coat the edge part even if electrodeposition coating is employed. Moreover, a coating film is sometimes flowed off from the edge part during heating and curing due to the leveling action and heat flow and, as a result, rust prevention property will be deteriorated. Therefore, in coating of an object to be coated having an edge part, means for improving the rust prevention property of the edge part has been demanded.

One example of a method for improving the rust prevention property of an edge part is a method including suppressing the flow of an electrodeposition coating film due to heat flow during heating and curing of an electrodeposition coating film, thereby securing a film thickness at the edge part, and thereby improving the rust prevention property. In this method, in order to suppress the flow of a coating film due to heat flow during heating and curing, there is employed a technique of increasing the viscosity of an electrodeposition coating composition by, for example, adding a thickener to the electrodeposition coating composition. However, the addition of a thickener to an electrodeposition coating composition will impair the leveling property of a coating film, so that the surface condition of a part other than the edge part, such as a flat part, will be impaired. For this reason, it is generally difficult to secure both improvement in rust prevention property of an edge part of an object to be coated and improvement in the surface condition of a coating film (improvement in coating film smoothness).

JP-A-2010-144104 (Patent Document 1) discloses a cationic electrodeposition coating composition containing (a) an amine-modified epoxy resin having an amine concentration of 1.0 mol/kg or more, (b) a blocked isocyanate compound, (c) cation-exchanged amorphous silica fine particles as essential components. This cationic electrodeposition coating composition is disclosed to be able to form a coating film superior in an edge covering property to an object to be coated and smoothness (in paragraph [0001], etc.). Patent Document 1 discloses that the edge covering property can be enhanced through development of structurally viscous behavior derived from the component (c) (in paragraph [0029], etc.). On the other hand, since the component (c) is a granular material, it aggregates itself in the electrodeposition coating composition, and therefore, a resulting coating film may be poor in smoothness. For example, in paragraph [0032], it is disclosed that an excessively large amount of the component (c) will impair the smoothness.

CITATION LIST

Patent Literature

Patent Literature 1: JP-A-2010-144104

SUMMARY OF THE INVENTION

Technical Problems

The present invention solves the above-described problems of conventional techniques, and an object of the present invention is to provide a cationic electrodeposition coating composition superior in rust prevention properties, especially an edge part rust prevention property.

Solution to Problems

In order to solve the above-described problems, the present invention provides the following embodiments.

[1]

A cationic electrodeposition coating composition containing a resin emulsion containing an aminated resin (A) and a blocked isocyanate curing agent (B), wherein a deposited electrodeposition coating film of the cationic electrodeposition coating composition has a coating film viscosity in the range of 5,000 to 1,000,000 mPa·s at 110° C., and a portion resulting from removal of a resin component from the deposited electrodeposition coating film of the cationic electrodeposition coating composition has a polarity term in the range of 2 to 30 mN/m.

[2]

The cationic electrodeposition coating composition further containing at least one metal element compound (C) selected from the group consisting of a Group 3 element compound, a zinc compound, and a bismuth compound, wherein a content of the metal element compound (C) contained in the cationic electrodeposition coating composition is in the range of 0.02 to 1% by mass in terms of metal element.

[3]

The cationic electrodeposition coating composition, wherein an amount of the metal element compound (C) in the portion resulting from the removal of the resin component from the cationic electrodeposition coating composition from the deposited electrodeposition coating film of the cationic electrodeposition coating composition is in the range of 1 to 100 mg/m$^2$ in terms of metal element.

[4]

The cationic electrodeposition coating composition, wherein a hydroxyl value of the aminated resin (A) is 150 to 400 mg KOH/g.

[5]

The cationic electrodeposition coating composition further containing an epoxy viscosity agent (D), wherein the epoxy viscosity agent (D) has an average particle size of 1 to 200 nm and a number-average molecular weight in the range of 100,000 to 10,000,000, and the epoxy viscosity agent (D) has amino groups, in which 30 to 100% of the amino groups is neutralized with acetic acid.

[6]

The cationic electrodeposition coating composition, wherein an amount of the epoxy viscosity agent (D) contained in the cationic electrodeposition coating composition is 0.1 to 15 parts by mass in terms of resin solid content relative to 100 parts by mass of a total of a resin solid content of the resin emulsion and a resin solid content of the epoxy viscosity agent (D).

[7]

The cationic electrodeposition coating composition further containing a metal nitrite (E).

[8]

A method for forming a cured electrodeposition coating film, the method including a step of performing electrodeposition coating by immersing an object to be coated in the cationic electrodeposition coating composition described above, and then forming a cured electrodeposition coating film on the object to be coated by performing heating and curing.

[9]

The method for forming a coating film, wherein the object to be coated has an edge part, and in an event that the object to be coated having the cured electrodeposition coating film formed has been subjected to a salt water spray test, a number of rust colonies formed per 1 $cm^2$ of a coated edge part is less than 3 colonies/$cm^2$.

Advantageous Effects of Invention

It is possible to form a cured electrodeposition coating film being superior in rust prevention properties, especially, an edge part rust prevention property, and having a superior coating film appearance by performing electrodeposition coating using a cationic electrodeposition coating composition of the present invention.

DESCRIPTION OF EMBODIMENTS

The cationic electrodeposition coating composition of the present invention is a cationic electrodeposition coating composition containing a resin emulsion containing an aminated resin (A) and a blocked isocyanate curing agent (B). In addition, the deposited electrodeposition coating film of the cationic electrodeposition coating composition of the present invention has a coating film viscosity in the range of 5,000 to 1,000,000 mPa·s at 110° C., and a portion resulting from removal of a resin component from the deposited electrodeposition coating film of the cationic electrodeposition coating composition has a polarity term in the range of 2 to 30 mN/m.

Resin Emulsion

The resin emulsion contains an aminated resin (A) and a blocked isocyanate curing agent (B). The resin emulsion may optionally further contain other components.

Aminated Resin (A)

The aminated resin (A) is a coating film-forming resin for constituting an electrodeposition coating film. As the aminated resin (A), an amine-modified epoxy resin obtained by modifying an oxirane ring in an epoxy resin skeleton with an amine compound is preferable. Generally, an amine-modified epoxy resin is prepared by ring-opening an oxirane ring in a starting raw material resin molecule via a reaction with an amine compound such as a primary amine, secondary amine or tertiary amine and/or an acid salt thereof. Typical examples of the starting raw material resin include polyphenol polyglycidyl ether type epoxy resins, which are reaction products of polycyclic phenol compounds, such as bisphenol A, bisphenol F, bisphenol S, phenol novolac, and cresol novolac, with epichlorohydrin. Examples of other starting raw material resins include the oxazoline ring-containing epoxy resins disclosed in JP-A-H05(1993)-306327. Such epoxy resins can be prepared via a reaction of a diisocyanate compound or a bisurethane compound obtained by blocking isocyanate groups of a diisocyanate compound with a lower alcohol such as methanol and ethanol, with epichlorohydrin.

The starting raw material resin can be chain-extended with a bifunctional polyester polyol, a polyether polyol, a bisphenol, a dibasic carboxylic acid, or the like before a ring opening reaction of an oxirane ring with an amine compound, and then used.

Likewise, before a ring opening reaction of an oxirane ring with an amine compound, to control a molecular weight or an amine equivalent or improve heat flowability, the starting raw material resin can be provided with addition of a monohydroxy compound such as 2-ethylhexanol, nonylphenol, ethylene glycol mono-2-ethylhexyl ether, ethylene glycol mono-n-butyl ether, propylene glycol mono-2-ethylhexyl ether, or a monocarboxylic acid such as octylic acid to some oxirane rings and then used.

An amine-modified epoxy resin is obtained by reacting oxirane rings of the above epoxy resin with an amine compound. Examples of the amine compound to be reacted with the oxirane rings include primary amines and secondary amines. If an epoxy resin is reacted with a secondary amine, an amine-modified epoxy resin having a tertiary amino group is obtained. If an epoxy resin is reacted with a primary amine, an amine-modified epoxy resin having a secondary amino group is obtained. Furthermore, by using a secondary amine having a blocked primary amine, an amine-modified epoxy resin having a primary amino group can be prepared. For example, the preparation of an amine-modified epoxy resin having a primary amino group and a secondary amino group may be carried out by blocking the primary amino group with a ketone to form a ketimine, then introducing it into an epoxy resin, and then performing deblocking. As the amine to be reacted with the oxirane ring, a tertiary amine may optionally be used in combination.

As the primary amine, the secondary amine, and the tertiary amine, those described above can be used. Examples of the secondary amine having a blocked primary amine include a ketimine of aminoethylethanolamine and a diketimine of diethylenetriamine. Examples of the tertiary amine which may optionally be used include triethylamine, N,N-dimethylbenzylamine, and N,N-dimethylethanolamine. These amines may be used singly, or two or more of them may be used in combination.

The amine compound to be reacted with oxirane rings of the epoxy resin may preferably be one containing 50 to 95% by mass of a secondary amine, 0 to 30% by mass of a secondary amine having a blocked primary amine, and 0 to 20% by mass of a primary amine.

The number-average molecular weight of the aminated resin (A) may preferably be within the range of 1,000 to 5,000. The condition that the number-average molecular weight is 1,000 or more affords good physical properties of a resulting cured electrodeposition coating film such as solvent resistance and corrosion resistance. On the other hand, the condition that the number-average molecular weight is 5,000 or less makes it easy to adjust the viscosity of the aminated resin and possible to perform smooth synthesis, and makes it easy to handle emulsification and dispersion of the resulting amine-modified epoxy resin (A). The number-average molecular weight of the aminated resin (A) may preferably be within the range of 2,000 to 3,500.

The aminated resin (A) may preferably have an amine value within the range of 20 to 100 mg KOH/g. The condition that the amine value of the aminated resin (A) is 20 mg KOH/g or more leads to good emulsification-dispersion stability of the aminated resin (A) in an electrodeposition coating composition. On the other hand, the condition that the amine value is 100 mg KOH/g or less leads to a proper number of amino groups in a cured electrodeposition coating film and will have no possibility to lower the water resistance of a coating film. The amine value of the aminated resin (A) is more preferably within the range of 20 to 80 mg KOH/g.

The hydroxyl value of the aminated resin (A) may preferably be within the range of 150 to 650 mg KOH/g. The condition that the hydroxyl value is 150 mg KOH/g or more leads to good curing of a cured electrodeposition coating film and also improves the appearance of a coating film. On the other hand, the condition that the hydroxyl value is 650 mg KOH/g or less leads to a proper amount of hydroxyl groups remaining in a cured electrodeposition coating film and will have no possibility to lower the water resistance of a coating film. The hydroxyl value of the aminated resin (A) is more preferably within the range of 150 to 400 mg KOH/g.

In the electrodeposition coating composition of the present invention, use of an aminated resin (A) having a number-average molecular weight within the range of 1,000 to 5,000, an amine value of 20 to 100 mg KOH/g, and a hydroxyl value of 150 to 650 mg KOH/g, more preferably 150 to 400 mg KOH/g, affords an advantage that superior corrosion resistance can thereby be imparted to an object to be coated.

As the aminated resin (A), aminated resins differing in amine value and/or hydroxyl value may optionally be used in combination. When two or more aminated resins differing in amine value and hydroxyl value are used in combination, the average amine value and the average hydroxyl value calculated on the basis of the mass ratio of the aminated resins to be used are preferably within the above-mentioned numerical values. As the aminated resins (A) to be used in combination, an aminated resin having an amine value of 20 to 50 mg KOH/g and a hydroxyl value of 50 to 300 mg KOH/g and an aminated resin having an amine value of 50 to 200 mg KOH/g and a hydroxyl value of 200 to 500 mg KOH/g are preferably used in combination. Use of such a combination affords an advantage that superior corrosion resistance can thereby be imparted because the core part of an emulsion is thereby made more hydrophobic and the shell part of the emulsion is made more hydrophilic.

The aminated resin (A) may optionally contain an amino group-containing acrylic resin, an amino group-containing polyester resin, or the like.

Blocked Isocyanate Curing Agent (B)

The blocked isocyanate curing agent (B) (hereinafter sometimes simply referred to as "curing agent (B)") is a coating film-forming resin that constitutes an electrodeposition coating film. The blocked isocyanate curing agent (B) can be prepared by blocking a polyisocyanate with an encapsulant.

Examples of the polyisocyanate include aliphatic diisocyanates such as hexamethylene diisocyanate (including a trimer), tetramethylene diisocyanate and trimethylhexamethylene diisocyanate; alicyclic polyisocianates such as isophorone diisocyanate and 4,4'-methylene-bis(cyclohexyl isocyanate); and aromatic diisocyanates such as 4,4'-diphenylmethane diisocyanate, tolylene diisocyanate and xylylene diisocyanate.

Examples of the encapsulant that may preferably be used include monohydric alkyl (or aromatic) alcohols such as n-butanol, n-hexyl alcohol, 2-ethylhexanol, lauryl alcohol, phenol carbinol and methylphenyl carbinol; cellosolves such as ethylene glycol monohexyl ether and ethylene glycol mono-2-ethylhexyl ether; polyether-type both-ended diols such as polyethylene glycol, polypropylene glycol and polytetramethylene ether glycol phenol; polyester-type both-ended polyols obtained from a diol such as ethylene glycol, propylene glycol or 1,4-butanediol and a dicarboxylic acid such as oxalic acid, succinic acid, adipic acid, suberic acid or sebacic acid; phenols such as para-t-butylphenol and cresol; oximes such as dimethyl ketoxime, methyl ethyl ketoxime, methyl isobutyl ketoxime, methyl amyl ketoxime and cyclohexanone oxime; and lactams typified by ε-caprolactam and γ-butyrolactam.

The blocking ratio of the blocked isocyanate curing agent (B) may preferably be 100%. This affords an advantage that the storage stability of the electrodeposition coating composition is improved.

As the blocked isocyanate curing agent (B), a curing agent prepared by blocking an aliphatic diisocyanate with an encapsulant and a curing agent prepared by blocking an aromatic diisocyanate with an encapsulant may preferably be used in combination.

The blocked isocyanate curing agent (B) preferentially reacts with the primary amine of the aminated resin (A), and further reacts with a hydroxyl group to be cured. As the curing agent, at least one curing agent selected from the group consisting of organic curing agents such as melamine resin or phenol resin, silane coupling agents, and metal curing agents may be used in combination with the blocked isocyanate curing agent (B).

Preparation of Resin Emulsion

The resin emulsion can be prepared by dissolving each of the aminated resin (A) and the blocked isocyanate curing agent (B) in an organic solvent to prepare a solution, mixing these solutions, and then performing neutralization with a neutralizing acid. Examples of the neutralizing acid include organic acids such as methanesulfonic acid, sulfamic acid, lactic acid, dimethylol propionic acid, formic acid, and acetic acid. In the present invention, it is more preferable to neutralize the resin emulsion containing the aminated resin (A) and the curing agent (B) with one or more acids selected from the group consisting of formic acid, acetic acid, and lactic acid.

The content of the curing agent (B) is required be an amount sufficient for reacting with a primary amino group, a secondary amino group, or an active hydrogen-containing functional group such as a hydroxyl group in the aminated resin (A) during curing to afford a good cured coating film. A preferred content of the curing agent (B) is within the range of 90/10 to 50/50, more preferably 80/20 to 65/35, in terms of the solid mass ratio of the aminated resin (A) to the curing agent (B) (aminated resin (A)/curing agent (B)). By adjusting the solid mass ratio of the aminated resin (A) and the curing agent (B), the fluidity and the curing rate of the coating film (deposited film) at the time of film formation are improved, and the coating film appearance is improved.

The solid content of the resin emulsion is usually 25 to 50% by mass, preferably 35 to 45% by mass, based on the total amount of the resin emulsion. Here, the term "the solid content of a resin emulsion" means the mass of all components that are contained in the resin emulsion and remain in a solid form even after the removal of a solvent. Specifically, it means the total of the mass of the aminated resin (A), the curing agent (B), and other solid components optionally added, which are contained in the resin emulsion.

The neutralizing acid is more preferably used in an amount of 10 to 100%, even more preferably 20 to 70%, in the equivalent ratio of the neutralizing acid to the equivalent of the amino groups of the aminated resin (A). In this description, the equivalent ratio of the neutralizing acid to the equivalent of the amino groups of the aminated resin (A) is taken as the neutralization ratio. When the neutralization ratio is 10% or more, the affinity to water is secured and the dispersibility in water is improved.

Metal Element Compound (C)

The cationic electrodeposition coating composition of the present invention preferably contains at least one metal element compound (C) selected from the group consisting of Group 3 element compounds, zinc compounds, and bismuth compounds. Due to the inclusion of the metal element compound (C) in the cationic electrodeposition coating composition, a cured electrodeposition coating film superior in rust prevention property will be obtained.

The Group 3 element compound may preferably be one or more species selected from the group consisting of lanthanum oxide, lanthanum hydroxide, neodymium oxide, neodymium hydroxide, a mixture of lanthanum oxide and an organic acid, a mixture of lanthanum hydroxide and an organic acid, a mixture of neodymium oxide and an organic acid, and a mixture of neodymium hydroxide and an organic acid. The zinc compound may preferably be one or more species selected from the group consisting of zinc oxide, zinc hydroxide, a mixture of zinc oxide and an organic acid, and a mixture of zinc hydroxide and an organic acid. The bismuth compound may preferably be one or more species selected from the group consisting of bismuth oxide, bismuth hydroxide, a mixture of bismuth oxide and an organic acid, and a mixture of bismuth hydroxide and an organic acid.

The metal element compound (C) may preferably be a Group 3 element compound. The metal element compound (C) is more preferably a lanthanum compound, and the metal element compound (C) is even more preferably one or more species selected from the group consisting of lanthanum oxide, lanthanum hydroxide, a mixture of lanthanum oxide and an organic acid, and a mixture of lanthanum hydroxide and an organic acid.

When a bismuth compound is used as the metal element compound (C), the metal element compound (C) can be used as a curing catalyst for the cationic electrodeposition coating composition. In the field of coatings, organic tin catalysts are commonly used as a curing catalyst. However, organic tin catalysts are catalysts that will possibly be restricted to use in the future from recent environmental control trends. Since the aforementioned bismuth compound is superior in curability, it can be used as an alternative catalyst for organic tin catalysts which are commonly used as a curing catalyst in the field of coatings. Therefore, the use of the bismuth compound affords an advantage that a cationic electrodeposition coating composition with reduced environmental load can be provided.

In the case of using at least one species selected from the group consisting of lanthanum oxide, lanthanum hydroxide, neodymium oxide, neodymium hydroxide, zinc oxide, zinc hydroxide, bismuth oxide, and bismuth hydroxide as the metal element compound (C), these metal element compounds (C) may be in a powdery form. When the metal element compound (C) is in a powdery form, the average particle size thereof may preferably be 0.01 to 10 μm, and more preferably 0.05 to 2 μm. In the present description, the average particle size refers to a volume-average particle diameter D50, which is a value measured with a dispersion diluted with ion-exchanged water such that an appropriate signal level is attained using a laser Doppler type particle size analyzer ("Microtrac UPA150" manufactured by Nikkiso Co., Ltd.).

When a mixture of lanthanum oxide and/or lanthanum hydroxide, for example, and an organic acid is used as the metal element compound (C), the mixture can be prepared by mixing lanthanum oxide and/or lanthanum hydroxide with an organic acid in advance. As the organic acid, one or more species selected from the group consisting of hydroxymonocarboxylic acids and sulfonic acids can suitably be used.

Examples of the hydroxycarboxylic acid include the following compounds:

monohydroxymonocarboxylic acids, particularly aliphatic monohydroxymonocarboxylic acids, which have 2 to 5, preferably 2 to 4 carbon atoms in total, such as lactic acid and glycolic acid; and dihydroxy monocarboxylic acids, particularly aliphatic dihydroxy monocarboxylic acids, which have 3 to 7, preferably 3 to 6 carbon atoms in total, such as dimethylol propionic acid (DMPA) and glyceric acid.

The sulfonic acid is an organic sulfonic acid, and examples thereof include alkanesulfonic acids having 1 to 5, preferably 1 to 3 carbon atoms in total, such as methanesulfonic acid and ethanesulfonic acid.

The organic acid may preferably be one or more species selected from the group consisting of lactic acid, dimethylolpropionic acid and methanesulfonic acid.

The form of use of the organic acid is not particularly limited, and examples thereof include a solid form, a liquid form, and a solution form with the organic acid dissolved in a solvent (especially, an aqueous solution form). The organic acid may preferably be used in the form of an aqueous solution. Examples of a solvent that can be used for the preparation of an aqueous solution of an organic acid include water such as ion-exchanged water, purified water and distilled water, and an aqueous solvent containing water as a main component. The aqueous solvent may contain an optional organic solvent (e.g., a water-soluble or water-miscible organic solvent such as alcohols, esters, and ketones) in addition to water.

In the event that a mixture of lanthanum oxide and/or lanthanum hydroxide and an organic acid is prepared in advance, the ratio of the number of moles of lanthanum in lanthanum oxide and/or lanthanum hydroxide to the number of moles of the organic acid may preferably be within the range of lanthanum:organic acid=1:0.3 to 1:2.7. Lanthanum is a rare earth element that becomes a trivalent cation. Hydroxymonocarboxylic acids and sulfonic acids that can be suitably used as the organic acid are monovalent acids. Therefore, the case where the ratio of the number of moles of lanthanum to the number of moles of an organic acid is within the range of lanthanum:organic acid=1:0.3 to 1:2.7 is a state where the total valence of cations derived from lanthanum metal element (that is, the number of moles of the metal element×3) is less than the total valence of anions derived from the organic acid (the number of moles of the organic acid). Using lanthanum oxide and/or lanthanum hydroxide and an organic acid in the above ratio makes it possible to prepare a cationic electrodeposition coating composition that provides a cured coating film having particularly superior edge part rust prevention performance and superior coating film appearance. The ratio of the numbers of moles is more preferably within the range of lanthanum:organic acid=1:0.6 to 1:2.4, even more preferably lanthanum:organic acid=1:0.9 to 1:2.1.

In the case of using a metal element compound (C), the content of the metal element compound (C) contained in a cationic electrodeposition coating composition may preferably be an amount equivalent to 0.02 to 1% by mass, more preferably an amount equivalent to 0.02 to 0.5% by mass, and particularly preferably an amount equivalent to 0.05 to 0.3% by mass, in terms of metal element based on the whole mass of the cationic electrodeposition coating composition. When the amount of the metal element compound (C) is in the above range, there is an advantage that further improved rust prevention performance can be obtained.

In the present description, the "resin solid content of a cationic electrodeposition coating composition" means the solid mass of a coating film-forming resin. Specifically, it means the total amount of the resin solid content of the aminated resin (A) and the curing agent (B).

"In terms of metal element" means determining the amount of a target metal element by multiplying the content of a metal element compound (C) by a metal element conversion factor (a factor for converting the amount of the metal element compound (C) to the amount of the metal element, specifically, a value calculated by dividing the atomic weight of the metal element in the metal element compound (C) by the molecular weight of the metal element compound (C)). For example, when the metal element compound (C) is lanthanum oxide ($La_2O_3$, molecular weight: 325.8), the content of lanthanum in terms of metal element in an electrodeposition coating composition containing 0.1% by mass of lanthanum oxide is calculated to be 0.0853% by mass by the calculation: 0.1% by mass %×(277.8÷325.8).

Epoxy Viscosity Agent (D)

The cationic electrodeposition coating composition of the present invention may contain an epoxy viscosity agent (D). By containing the epoxy viscosity agent (D), a coating film viscosity at 110° C. of the deposited electrodeposition of the cationic electrodeposition coating composition can be suitably adjusted in the range of 5,000 to 1,000,000 mPa·s.

The epoxy viscosity agent (D) may preferably have an average particle size of 1 to 200 nm. The condition that the average particle size is 1 to 200 nm leads to an advantage that the dispersibility of the epoxy viscosity agent (D) in the cationic electrodeposition coating composition is improved.

In this description, the average particle size of the epoxy viscosity agent (D) is a volume-average particle diameter. The volume-average particle diameter of a resin emulsion can be measured by a laser light scattering method. Examples of a device that can be used for the measurement of the average particle size of a resin emulsion include Microtrac UPA150 (manufactured by Nikkiso Co., Ltd.), which is a laser Doppler type particle size analyzer.

In this description, the number-average molecular weight of the epoxy viscosity agent (D) can be measured by gel permeation chromatography (GPC) using a polystyrene standard sample after removing moisture by reduced pressure drying or the like. Specifically, the number-average molecular weight is measured under the following GPC system measurement conditions.

Apparatus: alliance 2695 Separations Module
Column: Tosoh TSK gel ALPHA-M
Flow rate: 0.05 ml/min
Detector: alliance 2414 Refractive Index Detector
Mobile phase: N,N'-dimethylformamide
Standard samples: TSK STANDARD POLYSTYRENE (produced by Tosoh Corporation), A-500, A-2500, F-1, F-4, F-20, F-80, F-700, 1-phenylhexane (produced by Aldrich)

The epoxy viscosity agent (D) may preferably have an amine value in the range of 50 to 200 mg KOH/g. The condition that the amine value of the epoxy viscosity agent (D) is 50 mg KOH/g or more leads to good emulsification-dispersion stability of the epoxy viscosity agent (D). On the other hand, thanks to the condition that the amine value is 200 mg KOH/g or less, the decrease in water resistance of the coating film can be prevented. Furthermore, the condition that the amine value of the epoxy viscosity agent (D) is within the above-mentioned range leads to an advantage that the conductivity of the electrodeposition coating composition can be kept within an appropriate range and adverse effects on coating workability can be prevented.

The epoxy viscosity agent (D) may preferably have a number-average molecular weight of 100,000 to 10,000,000. That the value of the number-average molecular weight of the epoxy viscosity agent (D) is high means that the content of the low molecular weight substance contained in the epoxy viscosity agent (D) is small. Therefore, inclusion of the epoxy viscosity agent (D) in the cationic electrodeposition coating composition is not accompanied by such problems as decrease in curability and decrease in hardness of a resulting coating film due to the inclusion of a low molecular weight substance. In addition, by the inclusion of the epoxy viscosity agent (D) in the cationic electrodeposition coating composition, the viscosity of the cationic electrodeposition coating composition can be effectively raised.

The epoxy viscosity agent (D) has a polyphenol polyglycidyl ether structure and a polycyclic phenol structure as a resin skeleton. These structures are in common with the structures of the aminated resin, which is a coating film-forming resin and is commonly used in cationic electrodeposition coating compositions. For this reason, the epoxy viscosity agent (D) has high compatibility with the coating film-forming resin of the cationic electrodeposition coating composition. This leads to an advantage that even when a relatively large amount of the epoxy viscosity agent (D) is contained in the cationic electrodeposition coating composition, a coating film appearance defect (for example, generation of repelling, craters, etc.) based on difference in compatibility. The epoxy viscosity agent (D) can be suitably used as a viscosity regulator for a cationic electrodeposition coating composition.

The epoxy viscosity agent (D) can be produced by a method including, for example, the following steps:

an amine modification step of reacting an epoxy resin containing a polyphenol polyglycidyl ether type epoxy resin and a polycyclic phenol compound with an amine compound to obtain an amine-modified epoxy resin;

an acid neutralization and dispersion step of neutralizing some or all of the amino groups of the resulting amine-modified epoxy resin with an acid and dispersing the resin in a water solvent; and a reaction step of mixing and reacting the resulting dispersion with a polyphenol polyglycidyl ether type epoxy resin to obtain an epoxy viscosity agent (D). Here, the amine compound includes a ketimine derivative. The mole % of the ketimine derivative may preferably be 40 to 100 mole % based on the total molar amount of the amine compound, the acid neutralization ratio in the acid neutralization and dispersion step may preferably be within the range of 30 to 100%, and the amount of the polyphenol polyglycidyl ether type epoxy resin to be reacted in the above reaction step may preferably be 0.5 to 4.0 mol per 1 mol of the ketimine derivative.

Amine Modification Step

The amine modification step is a step of obtaining an amine-modified epoxy resin by reacting an epoxy resin containing a polyphenol polyglycidyl ether type epoxy resin and a polycyclic phenol compound with an amine compound. The epoxy resin to be used in the amine modification step contains at least a polyphenol polyglycidyl ether type epoxy resin and a polycyclic phenol compound. In this description, the term "the epoxy resin containing a polyphenol polyglycidyl ether type epoxy resin and a polycyclic phenol compound" includes a state where the polyphenol polyglycidyl ether type epoxy resin and the polycyclic phenol compound have undergone a reaction (chain extension reaction). In the amine modification step, it may be preferable to use an epoxy resin in which the polyphenol polyglycidyl ether type epoxy resin and the polycyclic phenol compound have undergone a reaction (chain extension reaction). The reaction condition under which the polyphenol polyglycidyl ether type epoxy resin and the polycyclic phenol compound are made to undergo a chain extension reaction can be appropriately chosen according to the stirring apparatus to be used, a reaction scale, etc. Examples the reaction condition include a condition where the reaction is carried out preferably at 85 to 180° C. for 0.1 to 8 hours, more preferably at 100 to 150° C. for 2 to 8 hours. As the stirring apparatus to be used, a stirrer that is commonly used in the field of coatings can be used.

Examples of the polycyclic phenol compound include bisphenol A, bisphenol F, bisphenol S, phenol novolac, and cresol novolac. It may be preferable to use bisphenol A, bisphenol F, or a mixture thereof as the polycyclic phenol compound.

Examples of the polyphenol polyglycidyl ether type epoxy resin include a polyphenol polyglycidyl ether type epoxy resin that is a reaction product of the above-mentioned polycyclic phenol compound and epichlorohydrin.

The epoxy resin may optionally be made to undergo a chain extension reaction partly with a bifunctional polyester polyol, a polyether polyol (for example, a polyol having a polyethylene oxide group and a polyol having a polypropylene oxide group), a dibasic carboxylic acid, or the like prior to the ring opening reaction of oxirane rings with an amine compound. For example, when performing a chain extension reaction using a polyol having a polypropylene oxide group, a polypropylene oxide group-containing epoxy resin is formed.

One embodiment of the present invention may be an embodiment where the epoxy resin to be reacted with the amine compound in the amine modification step is an epoxy resin containing a polyphenol polyglycidyl ether type epoxy resin, a polycyclic phenol compound, and a polypropylene oxide group-containing epoxy resin. Examples of this embodiment include a state where the polyphenol polyglycidyl ether type epoxy resin, the polycyclic phenol compound, and the polypropylene oxide group-containing epoxy resin have undergone a reaction (chain extension reaction). When the epoxy resin to be reacted with the amine compound in the amine modification step contains a polypropylene oxide group-containing epoxy resin, the content of the polypropylene oxide group-containing epoxy resin may preferably be 1 to 40 parts by mass, and more preferably 15 to 25 parts by mass, relative to 100 parts by mass of the epoxy resin. The inclusion of the polypropylene oxide group-containing epoxy resin leads to an advantage that, even when a relatively large amount of the epoxy viscosity agent (D) is contained in the cationic electrodeposition coating composition, increase in viscosity of the composition can be suppressed during the preparation of a coating and coating workability can be kept good.

The epoxy resin can be used with addition of a monohydroxy compound such as 2-ethylhexanol, nonylphenol, ethylene glycol mono-2-ethylhexyl ether, ethylene glycol mono-n-butyl ether, propylene glycol mono-2-ethylhexyl ether, or a monocarboxylic acid such as octylic acid to some oxirane rings optionally performed before a ring opening reaction of an oxirane ring with an amine compound in order to control a molecular weight or an amine equivalent or improve heat flowability.

By reacting oxirane rings (epoxy groups) of the epoxy resin with the amine compound, amine modification proceeds due to a ring opening reaction of the oxirane rings, so that an amine-modified epoxy resin is obtained. Examples of the amine compound to be reacted with the oxirane rings include primary amines and secondary amines. If an epoxy resin is reacted with a secondary amine, an amine-modified epoxy resin having a tertiary amino group is obtained. If an epoxy resin is reacted with a primary amine, an amine-modified epoxy resin having a secondary amino group is obtained. Furthermore, by using a secondary amine having a blocked primary amine, an amine-modified epoxy resin having a primary amino group can be prepared. For example, the preparation of an amine-modified epoxy resin having a primary amino group and a secondary amino group may be carried out by blocking the primary amino group with a ketone to form a ketimine, then introducing it into an epoxy resin, and then performing deblocking. As the amine to be reacted with the oxirane ring, a tertiary amine may optionally be used in combination.

Examples of the primary amine and the secondary amine include butylamine, octylamine, diethylamine, dibutylamine, methylbutylamine, monoethanolamine, diethanolamine, N-methylethanolamine, and diethylenetriamine. Examples of the secondary amine having a blocked primary amine include ketimine derivatives such as a ketimine of aminoethylethanolamine and a diketimine of diethylenetriamine. Examples of the tertiary amine which may optionally be used include triethylamine, N,N-dimethylbenzylamine, and N,N-dimethylethanolamine. These amines may be used singly, or two or more of them may be used in combination.

In the amine modification step, an amount of the amine compound to be reacted with the epoxy resin may preferably be in an amount of 0.9 to 1.2 equivalents per 1 equivalent of the epoxy groups of the epoxy resin. Regarding the "the equivalent of an amine compound", calculation is carried out with 1 mole of the ketimine derivative being taken as 1 equivalent.

In the present invention, the amine compound to be reacted in the amine modification step preferably contains the ketimine derivative in the range of 40 to 100 mole % relative to the total molar amount of the amine compound. The condition where the amine compound contains the ketimine derivative in the above range makes it possible to suitably adjust the number-average molecular weight of a resulting epoxy viscosity agent within the range of 100,000 to 10,000,000. When the amount of the ketimine derivative relative to the total amount of the amine compound is less than 40 mole %, an increased amount of low molecular weight epoxy components will remain, so that coating film curability may be deteriorated.

When the amine compound contains amine compounds other than ketimine derivatives, the molar ratio of a secondary amine to a primary amine may preferably be within the range of (the secondary amine):(the primary amine)=40 to 70 mole %:30 to 60 mol % in the amine compounds other than the ketimine derivatives.

The reaction condition under which the epoxy resin is reacted with the amine compound to effect amine modification can be chosen appropriately according to the reaction scale, etc. Examples the reaction condition include a condition where the reaction is carried out preferably at 80 to 150° C. for 0.1 to 5 hours, more preferably at 120 to 150° C. for 0.5 to 3 hours.

After amine compounds including a ketimine derivative is introduced into an epoxy resin via an amine modification reaction, an amino group such as a primary amino group which had been blocked is regenerated by deblocking a blocking agent such as a ketone possessed by the ketimine derivative. The blocking agent is deblocked by hydrolysis during acid neutralization and dispersion in the acid neutralization and dispersion step described below.

Acid Neutralization and Dispersion Step

The acid neutralization and dispersion step is a step in which an amine-modified epoxy resin is dispersed in a water solvent by neutralizing some or all of the amino groups possessed by the amine-modified epoxy resin with an acid. In the acid neutralization and dispersion step, the acid neutralization ratio of the amino groups possessed by the amine-modified epoxy may preferably be 30 to 100%. The acid neutralization ratio referred to herein means the percentage of the number of the amino groups neutralized with the acid relative to the number of all the amino groups of the amine-modified epoxy resin. When the acid neutralization ratio of the amino groups is less than 30%, aggregation of a reaction product may occur during the preparation of the epoxy viscosity agent. In addition, the condition that the neutralization ratio is within the above range makes it possible to avoid adverse effects on the conductivity of the cationic electrodeposition coating composition when the epoxy viscosity agent (D) is added to the cationic electrodeposition coating composition. The condition that the neutralization ratio is within the above range has an advantage that the coating film viscosity directly involved in edge part rust prevention performance can be effectively raised without adversely affecting coating workability, etc.

Examples of the acid to be used in the acid neutralization and dispersion step include organic acids such as formic acid, lactic acid, and acetic acid, and inorganic acids such as phosphoric acid and nitric acid. Acetic acid may preferably be used as the acid.

The amine-modified epoxy resin in which some or all of the amino groups have been neutralized is dispersed in a water solvent. The dispersion in the water solvent may be carried out by adding the water solvent under stirring conditions to the partially or completely neutralized amine-modified epoxy resin, and also may be carried out by adding the partially or completely neutralized amine-modified epoxy resin to the water solvent under stirring conditions.

The water solvent contains water and may optionally contain an organic solvent in an amount within which the dispersion step is not disturbed.

The above dispersion affords an oil-in-water (O/W type) dispersion of the amine-modified epoxy resin. The amine-modified epoxy resin dispersion obtained in the dispersion step may preferably have a resin solid concentration in the range of 5 to 30% by mass.

The water solvent may optionally contain a resin dispersant containing one or more species selected from the group consisting of quaternary ammonium group-containing epoxy resins and tertiary sulfonium group-containing epoxy resins. As such a resin dispersant, a so-called pigment dispersion resin, which is commonly used in the preparation of a cationic electrodeposition coating composition, can be suitably used.

When the resin dispersant is contained in the water solvent, the content of the resin dispersant may preferably be within the range of 0.1 to 20 parts by mass in terms of resin solid content relative to 100 parts by mass of the resin solid content of the amine-modified epoxy resin.

Reaction Step

The reaction step is a step of obtaining an epoxy viscosity agent (D) by mixing and reacting a polyphenol polyglycidyl ether type epoxy resin with the dispersion obtained in the dispersion step. The polyphenol polyglycidyl ether type epoxy resin to be used in the reaction step is a resin that is to be additionally used to the polyphenol polyglycidyl ether type epoxy resin used in the above-described amine modification step. In the reaction step, the polyphenol polyglycidyl ether type epoxy resin is additionally reacted. In the reaction step, the polyphenol polyglycidyl ether type epoxy resin is reacted and polymerized with amino groups, such as primary amino groups, regenerated by deblocking of the blocking agent of the ketimine derivative. This reaction has an advantage that the number-average molecular weight of the resulting epoxy viscosity agent increases to over 100, 000.

As the polyphenol polyglycidyl ether type epoxy resin to be made to be reacted in the reaction step, the polyphenol polyglycidyl ether type epoxy resin mentioned in the above-described amine modification step can be used suitably.

The amount of the polyphenol polyglycidyl ether type epoxy resin to be reacted in the reaction step may preferably be 0.5 to 4.0 mol relative to 1 mol of the ketimine derivative. This amount may preferably be 0.5 to 3.0 mol, more preferably 0.8 to 2.5 mol, and even more preferably 1.0 to 2.0 mol. When the amount of the polyphenol polyglycidyl ether type epoxy resin is less than the above-mentioned amount, the number-average molecular weight of the resulting epoxy viscosity agent (D) may be less than the desired range. Moreover, in the case where the amount of the polyphenol polyglycidyl ether type epoxy resin exceeds the above-mentioned range, when it is added to a coating material composition, the coating workability of the coating material composition may be poor.

In the present invention, it may be preferable to react a polyphenol polyglycidyl ether type epoxy resin with the oil-in-water (O/W type) dispersion of the amine-modified epoxy resin obtained in the dispersion step described above. In this case, a so-called internal crosslinking reaction proceeds in the oil-in-water (O/W type) dispersion of the amine-modified epoxy resin in the reaction step. Further, the amount of the ketimine derivative contained in the amine compound to be used in the amine modification step of the epoxy resin may preferably be 40 to 100 mol %. This leads to an advantage that a resin having a large molecular weight, such as a number-average molecular weight of 100,000 to 10,000,000, can be obtained with a content of low molecular weight compounds.

The reaction condition in the reaction step can be appropriately chosen according to the reaction scale, etc. Examples of the reaction condition include a condition under which the reaction is carried out at room temperature to 90° C. for 3 to 10 hours.

The above-described production method has an advantage that it is possible to produce an epoxy viscosity agent having an average particle size of 1 to 200 nm even when the number-average molecular weight is very large as in the above-mentioned range.

The cationic electrodeposition coating composition of the present invention may preferably contain both the metal element compound (C) and the epoxy viscosity agent (D). The condition that the cationic electrodeposition coating composition of the present invention contains both the metal element compound (C) and the epoxy viscosity agent (D) has an advantage that a deposited metal element compound (C) and a resin component can be effectively made to retain at an edge part, so that a cured electrodeposition coating film having extremely excellent edge part rust prevention property can be formed.

Pigment Dispersion Paste

The cationic electrodeposition coating composition of the present invention may optionally contain a pigment dispersion paste. The pigment dispersion paste is a component that is optionally contained in an electrodeposition coating composition, and it commonly contains a pigment dispersion resin and a pigment.

Pigment Dispersion Resin

The pigment dispersion resin is a resin for dispersing a pigment, and it is dispersed in an aqueous medium and then used. As the pigment dispersion resin, there can be used a pigment dispersion resin having a cationic group, such as a modified epoxy resin having at least one member selected from the group consisting of a quaternary ammonium group, a tertiary sulfonium group, and a primary amino group. Examples of the pigment dispersion resin include a quaternary ammonium group-containing epoxy resin and a tertiary sulfonium group-containing epoxy resin. As the aqueous solvent, ion-exchanged water or water containing a small amount of alcohol is used.

Pigment

The pigment is a pigment that is commonly used in electrodeposition coating compositions. Examples of the pigment include inorganic pigments and organic pigments which are usually used, for example, color pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, and aluminum zinc phosphomolybdate.

Production of Pigment Dispersion Paste

The pigment dispersion paste is prepared by mixing a pigment dispersion resin and a pigment. The content of the pigment dispersion resin in the pigment dispersion paste is not particularly limited, and the pigment dispersion resin can be used in an amount of 20 to 100 parts by mass in terms of resin solid content fraction per 100 parts by mass of the pigment.

The solid content of the pigment dispersion paste may preferably be 40 to 70% by mass, particularly preferably 50 to 60% by mass, based on the total amount of the pigment dispersion paste.

The "solid content in a pigment dispersion paste" as referred to herein means the mass of all components contained in the pigment dispersion paste that remain in the form of solid even through removal of the solvent. Specifically, it means the total mass of the pigment dispersion resin, the pigment, and all other solid components optionally added that are contained in the pigment dispersion paste.

Other Components

The electrodeposition coating composition of the present invention may further contain a metal nitrite (E) in addition to the above-described components. As the metal nitrite (E), a nitrite of an alkali metal or a nitrite of an alkaline earth metal is preferable, and a nitrite of an alkaline earth metal is more preferable. Examples of the metal nitrite include calcium nitrite, sodium nitrite, potassium nitrite, magnesium nitrite, strontium nitrite, barium nitrite, and zinc nitrite.

The inclusion of the metal nitrite (E) in the electrodeposition coating composition has an advantage that corrosion resistance is improved, and especially, the corrosion resistance of an edge part (edge rust prevention property) is improved. When the electrodeposition coating composition contains the metal nitrite (E), the content thereof may preferably be 0.001 to 0.2% by mass in terms of metal element of the metal component relative to the total mass of the coating film-forming resin.

The metal nitrite (E) may be added to the electrodeposition coating composition by any method. For example, a method of preparing an aqueous solution of the metal nitrite (E) in advance and then adding it to the electrodeposition coating composition can be employed. Alternatively, the metal nitrite (E) may be mixed with a pigment beforehand and then dispersed in the same manner as the pigment.

Production of Cationic Electrodeposition Coating Composition

The cationic electrodeposition coating composition of the present invention can be prepared by mixing a resin emulsion containing an aminated resin (A) and a blocked isocyanate curing agent (B), and an optional metal element compound (C), an epoxy viscosity agent (D), a metal nitrite (E), a pigment dispersion paste, and additives or the like by a commonly used method. In the case of containing the epoxy viscosity agent (D), an amount of the epoxy viscosity agent (D) contained in the cationic electrodeposition coating composition may preferably be 0.1 to 15 parts by mass in terms of resin solid content relative to 100 parts by mass of the total of the resin solid content of the resin emulsion and the resin solid content of the epoxy viscosity agent (D). In addition, the metal element compound (C) to be optionally used may be in a state where it has been dispersed in advance together with the pigment at the time of the preparation of the pigment dispersion paste.

The "solid content of an electrodeposition coating composition" as referred to herein means the mass of all components contained in the electrodeposition coating composition that remain in the form of solid even through removal of the solvent. Specifically, that means the total of the solid masses of the aminated resin (A), the curing agent (B), and optionally-containing the metal element compound (C), the epoxy viscosity agent (D), the pigment dispersion resin, the pigment, and other solid components, which are contained in the electrodeposition coating composition.

The solid content of the cationic electrodeposition coating composition of the present invention may preferably be 1 to 30% by mass based on the total amount of the electrodeposition coating composition. When the solid content of the electrodeposition coating composition is less than 1% by mass, a reduced amount of an electrodeposition coating film will be deposited, so that it may be difficult to ensure sufficient corrosion resistance. When the solid content of the electrodeposition coating composition exceeds 30% by mass, throwing power or appearance may deteriorate.

The cationic electrodeposition coating composition of the present invention may preferably have a pH of 4.5 to 7. When the pH of the electrodeposition coating composition is less than 4.5, the amount of acid present in the cationic electrodeposition coating composition is excessive, so that coating film appearance or coating workability may be poor. On the other hand, when the pH exceeds 7, the filtration property of the electrodeposition coating composition deteriorates, and the horizontal appearance of a cured electrodeposition coating film may deteriorate. The pH of the electrodeposition coating composition can be set within the above range by adjusting the amount of a neutralizing acid to be used, the amount of a free acid to be added, etc. More preferably, the pH is 5 to 7.

The pH of the electrodeposition coating composition can be measured using a commercially available pH meter having a temperature compensation function.

The milligram equivalent (MEQ (A)) of an acid per 100 g of the solid content of an electrodeposition coating composition may preferably be 40 to 120. The milligram equivalent (MEQ (A)) of an acid per 100 g of the resin solid content of an electrodeposition coating composition can be adjusted by the amount of a neutralizing acid and the amount of a free acid.

MEQ (A) as referred to herein is an abbreviation of mg equivalent (acid), which is the sum total of mg equivalents of all acids per 100 g of the solid content of the paint. MEQ (A) can be measured by precisely weighing about 10 g of a solid of an electrodeposition coating composition, dissolving it in about 50 ml of a solvent (THF: tetrahydrofuran), then performing potentiometric titration using a 1/10 N NaOH solution and thereby determining the amount of an acid contained in the electrodeposition coating composition.

The cationic electrodeposition coating composition of the present invention may optionally contain additives commonly used in the field of coatings, e.g., organic solvents such as ethylene glycol monobutyl ether, ethylene glycol monohexyl ether, ethylene glycol monoethylhexyl ether, propylene glycol monobutyl ether, dipropylene glycol monobutyl ether and propylene glycol monophenyl ether, drying inhibitors, surfactants such as antifoaming agents, viscosity modifiers such as acrylic resin fine particles, cissing inhibitors, inorganic anticorrosive agents such as vanadium salts, copper, iron, manganese, magnesium, and calcium salts. In addition to these, known auxiliary complexing agents, buffers, smoothing agents, stress relaxation agents, brighteners, semi-brighteners, antioxidants, ultraviolet absorbers, etc. may be blended according to the intended purpose. These additives may be added during the production of a resin emulsion or may be added during the production of a pigment dispersion paste or may be added during or after the mixing a resin emulsion and a pigment dispersion paste.

The cationic electrodeposition coating composition of the present invention may contain other coating film-forming resin components in addition to the aminated resin (A). Examples of such other coating film-forming resin components include acrylic resins, polyester resins, urethane resins, butadiene resins, phenol resins, and xylene resins. As such other coating film-forming resin components that may be contained in the electrodeposition coating composition, phenol resins and xylene resins may be preferable.

Examples of the phenol resins and the xylene resins include xylene resins having 2 to 10 aromatic rings.

The deposited electrodeposition coating film of the cationic electrodeposition coating composition of the present invention is required to have a coating film viscosity at 110° C. within the range of 5,000 to 1,000,000 mPa·s. In this description, the term "deposited electrodeposition coating film" refers to an electrodeposition coating film in an uncured state that is to be deposited on an object to be coated when the cationic electrodeposition coating composition is electrodeposited. For a deposited electrodeposition coating film, the temperature of 110° C. can be regarded as a temperature that the electrodeposition coating film has just before the onset of the curing reaction of the coating film resin component contained in the film. The condition that the coating film viscosity of an electrodeposition coating film at 110° C. under such temperature conditions is 1,000,000 mPa·s or less makes it possible to secure flow of the electrodeposition coating film by heating, and it is possible to avoid a cured electrodeposition coating film from being uneven in film thickness. In addition, the condition that the coating film viscosity is 5,000 mPa·s or more makes it possible to avoid problems such as excessive flowing of the electrodeposition coating film due to heating, and resulting flowing down. The coating film viscosity at 110° C. may preferably be within the range of 5,000 to 500,000 mPa·s, more preferably within the range of 5,000 to 100,000 mPa·s, and particular preferably within the range of 6,000 to 20,000 mPa·s.

The coating film viscosity at 110° C. of a deposited electrodeposition coating film can be measured by the following procedure. An electrodeposition coating film is formed first by performing electrodeposition coating for 180 seconds on an object to be coated such that the resulting film comes to have a thickness of about 15 μm, and then the film is washed with water to remove an electrodeposition coating composition that has excessively adhered. Subsequently, excessive moisture adhering to the surface of the electrodeposition coating film is removed, and then the coating film is immediately taken out without drying, and thus a sample is prepared. By subjecting the thus-obtained sample to viscosity measurement by using a dynamic viscoelasticity measuring device, the coating film viscosity at 110° C. can be measured.

In the present invention, a polarity term of a portion resulting from removal of a resin component from the deposited electrodeposition coating film of the cationic electrodeposition coating composition is required to be within the range of 2 to 30 mN/m. The "polarity term" as referred to herein is a polarity term "γh" in the Owens-Wendt theoretical formula for calculating the surface free energy of a substance. A contact angle of a sample substance is measured using a liquid (water, methylene iodide) whose surface free energy value is known, and then the polarity term "γh" and the surface free energy of the sample substance can be calculated by using the theoretical formula of D. K. Owens and R. C. Wendt, J. Appl. Polym. Sci., 13, 1741 (1969)

The polarity term, referred to herein, of a portion resulting from removal of a resin component from the deposited electrodeposition coating film of the cationic electrodeposition coating composition can be measured by the following procedure. An electrodeposition coating film is formed first by performing electrodeposition coating for 180 seconds on an object to be coated such that the resulting film comes to have a thickness of about 15 μm, and then the film is washed with water to remove an electrodeposition coating composition that has excessively adhered. Subsequently, after removing excessive moisture adhering to the surface of the electrodeposition coating film, resin components of the coating film are dissolved and removed using a solvent such as tetrahydrofuran (THF). The polarity term of a portion resulting from removal of a resin component from the deposited electrodeposition coating film of the cationic electrodeposition coating composition can be measured by measuring the contact angles of the portion resulting from the removal of the resin components with respect to water and methylene iodide, and using the theoretical formula of D K Owens and R C Wendt, J. Appl. Polym. Sci., 13, 1741 (1969).

The condition that the polarity term of a portion resulting from removal of a resin component from the deposited electrodeposition coating film of the cationic electrodeposition coating composition is within the range of 2 to 30 mN/m has an advantage that a superior edge part rust prevention property can be obtained. In the step of heating and curing the electrodeposition coating film deposited on the object to be coated, the resin components come to have a reduced viscosity at the time of heating and curing and a flow occurs. Especially in an edge part, the rust prevention property tends to be deteriorated due to flow of the coating film due to occurrence of heat flow. Here, the condition that the polarity term is within the above-mentioned range improves the compatibility between an object to be coated and the resin component and, as a result, the electrodeposition coating film deposited at an edge part can be forced to stay, so that the rust prevention property is expected to be improved.

Examples of a means for adjusting the polarity term of a portion resulting from the removal of resin components from the deposited electrodeposition coating film of the cationic electrodeposition coating composition to the above-mentioned range include a means of blending the metal element compound (C) in the cationic electrodeposition coating composition, and a means of adjusting the content of the metal element compound (C) contained in the cationic electrodeposition coating composition to within the range of 0.02 to 1% by mass in terms of metal element.

The cationic electrodeposition coating composition of the present invention preferably contains the above-described metal element compound (C). In this case, an amount of the metal element compound (C) in the portion resulting from the removal of resin components from the deposited electrodeposition coating film of the cationic electrodeposition coating composition may preferably be within the range of 1 to 100 mg/m$^2$ in terms of metal element. The amount of the metal element compound (C) can be measured by the following procedure. An electrodeposition coating film is formed first by performing electrodeposition coating for 180 seconds on an object to be coated such that the resulting film comes to have a thickness of about 15 μm, and then the film is washed with water to remove an electrodeposition coating composition that has excessively adhered. Subsequently, after removing excessive moisture adhering to the surface of the electrodeposition coating film, resin components of the coating film are dissolved and removed using a solvent such as tetrahydrofuran (THF). Thus, the amount of the metal element compound (C) (in terms of metal element) can be measured by measuring the amount of the metal element compound (C) in the portion resulting from the removal of the resin components from a deposited electrodeposition coating film by fluorescent X-ray analysis.

Electrodeposition Coating and Formation of Electrodeposition Coating Film

By subjecting an object to be coated to electrodeposition coating using the cationic electrodeposition coating composition of the present invention, an electrodeposition coating film can be formed. In electrodeposition coating using the cationic electrodeposition coating composition of the present invention, an object to be coated is used as a cathode, and a voltage is applied between the cathode and an anode. As a result, an electrodeposition coating film is deposited on the object to be coated.

As an object to be coated with the cationic electrodeposition coating composition of the present invention, it is possible to use various materials which can be fed with electricity. Examples of the usable object to be coated include cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based steel sheets and tin-based plated steel sheets.

In an electrodeposition coating step, electrodeposition coating is performed by immersing an object to be coated in an electrodeposition coating composition, and then applying a voltage of 50 to 450 V. When the applied voltage is less than 50 V, electrodeposition may be insufficient, and when the applied voltage is more than 450 V, the coating film appearance may be poor. During electrodeposition coating, the bath liquid temperature of the coating material composition is usually adjusted to 10 to 45° C.

The time for which the voltage is applied varies depending on electrodeposition conditions, and it may be generally 2 to 5 minutes.

In the electrodeposition coating using the cationic electrodeposition coating composition of the present invention, the thickness of the electrodeposition coating film to be deposited may preferably be such that a thickness of the electrodeposition coating film finally obtained by heating and curing may preferably be 5 to 60 μm, more preferably 10 to 25 μm. If an electrodeposition coating film has a film thickness of less than 5 μm, the rust prevention property of the film may be insufficient.

The electrodeposition coating film deposited as described above can be cured by optionally washing it with water, and then heating it at, for example, 120 to 260° C., preferably 140 to 220° C., for 10 to 30 minutes. A cured electrodeposition coating film is thereby formed.

The cationic electrodeposition coating composition of the present invention affords an advantage that a cured electrodeposition coating film superior in edge part rust prevention property can be formed even when a cured electrodeposition coating film is formed on an object to be coated having an edge part. The cationic electrodeposition coating composition of the present invention has a function of forcing a deposited electrodeposition coating film to stay, and therefore, it can be used suitably in the case of forming a cured electrodeposition coating film on an object having an edge part.

In the present description, evaluation of the corrosion resistance of a cured electrodeposition coating film formed on an object to be coated having an edge part is performed by a salt water spray test (35° C.×72 hours) according to JIS Z2371 (2000). For example, when a cured electrodeposition coating film having a large film thickness, e.g., of 25 to 50 μm is subjected to a salt water spray test and the number of rust colonies formed at a coated edge part of the cured electrodeposition coating film formed on an object to be coated having an edge part is less than 3 colonies/cm² per 1 cm² of an edge part, the coating film is a coating film superior in corrosion resistance (rust prevention property) of the edge part, and when the number of rust colonies is less than 1 colony/cm² per 1 cm² of an edge part, the coating film is a coating film excellent in corrosion resistance of the edge part.

EXAMPLES

The present invention will be described hereafter in more detail by way of examples, to which the present invention is not intended to be limited. In the following examples, all designations of "part(s)" and "%" are on a mass basis, unless otherwise stated.

Production Example 1 Production of Pigment Dispersion Resin

Preparation of 2-Ethylhexanol Half-Blocked Isophorone Diisocyanate 222.0 parts of isophorone diisocyanate (hereinafter, abbreviated as IPDI) was added in a reaction vessel equipped with a stirrer, a condenser tube, a nitrogen inlet tube and a thermometer, and was diluted with 39.1 parts of methyl isobutyl ketone (MIBK), and 0.2 parts of dibutyltin dilaurate was added thereto. Thereafter, the mixture was heated to 50° C., and 131.5 parts of 2-ethylhexanol was then added dropwise under stirring in a dry nitrogen atmosphere over 2 hours, affording 2-ethylhexanol half-blocked IPDI (solid content: 90.0% by mass).

Preparation of Quaternization Agent 87.2 parts of dimethylethanolamine, 117.6 parts of a 75% lactic acid aqueous solution and 39.2 parts of ethylene glycol mono-n-butyl ether were sequentially added in a reaction vessel, and stirred at 65° C. for 30 minutes, and thus a quaternization agent was prepared.

Production of Pigment Dispersion Resin 710.0 parts of a bisphenol A-type epoxy resin (trade name: DER-331J, produced by The Dow Chemical Company) and 289.6 parts of bisphenol A were added in a reaction vessel, reacted in a nitrogen atmosphere at 150 to 160° C. for 1 hour, and then cooled to 120° C., and 498.8 parts of the previously prepared 2-ethylhexanol half-blocked IPDI (MIBK solution) was then added. The reaction mixture was stirred at 110 to 120° C. for 1 hour, 463.4 parts of ethylene glycol mono-n-butyl ether was added, the mixture was cooled to 85 to 95° C., and 196.7 parts of the previously prepared quaternization agent was added. The reaction mixture was maintained at 85 to 95° C. until the acid value thereof reached 1 mg KOH/g, and then 964 parts of deionized water was added to obtain the target epoxy resin (pigment dispersion resin) having a quaternary ammonium group (solid content: 50% by mass).

Production Example 2-1 Production of Aminated Resin (A-1)

92 parts of methyl isobutyl ketone, 940 parts of a bisphenol A-type epoxy resin (trade name: DER-331J, produced by The Dow Chemical Company), 382 parts of bisphenol A, 63 parts of octylic acid and 2 parts of dimethylbenzylamine were added, and reacted until the epoxy equivalent was 1220 g/eq while the inside of a reaction vessel was held at a temperature of 140° C., and cooling was then performed until the temperature of the inside of the reaction vessel was 120° C. A mixture of 85 parts of diethylenetriamine (methyl isobutyl ketone solution having a solid content of 73%) and 80 parts of diethanolamine was then added, and reacted at 120° C. for 1 hour, affording an aminated resin (cation-modified epoxy resin). The resin had a number-average molecular weight of 2,560, an amine value of 70 mg KOH/g (including an amine value derived from the primary amine of 42 mg KOH/g), and a hydroxyl value of 236 mg KOH/g.

Production Example 2-2 Production of Aminated Resin (A-2)

92 parts of methyl isobutyl ketone, 940 parts of a bisphenol A-type epoxy resin (trade name: DER-331J, produced by The Dow Chemical Company), 382 parts of bisphenol A, 63 parts of octylic acid and 2 parts of dimethylbenzylamine were added, and reacted until the epoxy equivalent was 1220 g/eq while the inside of a reaction vessel was held at a temperature of 140° C., and cooling was then performed until the temperature of the inside of the reaction vessel was 120° C. A mixture of 57 parts of diethylenetriamine (methyl isobutyl ketone solution having a solid content of 73%) and 91 parts of diethanolamine was then added, and reacted at 120° C. for 1 hour, affording an aminated resin (cation-modified epoxy resin). The resin had a number-average molecular weight of 2,560, an amine value of 70 mg KOH/g (including an amine value derived from the primary amine of 28 mg KOH/g), and a hydroxyl value of 270 mg KOH/g.

Production Example 3-1 Production of Blocked Isocyanate Curing Agent (B-1)

1680 parts of hexamethylene diisocyanate (HDI) and 732 parts of MIBK were added in a reaction vessel, and heated to 60° C. A solution of 346 parts of trimethylolpropane in 1067 parts of MEK oxime was added thereto dropwise at 60° C. over 2 hours. Further, the mixture was heated at 75° C. for 4 hours, and disappearance of an absorption based on an isocyanate group was then confirmed in IR spectrum measurement. The mixture was allowed to cool, and 27 parts of MIBK was then added, affording a blocked isocyanate curing agent (B-1) having a solid content of 78%. The isocyanate group value was 252 mg KOH/g.

Production Example 3-2 Production of Blocked Isocyanate Curing Agent (B-2)

1340 parts of 4,4'-diphenylmethane diisocyanate and 277 parts of MIBK were added in a reaction vessel, and heated to 80° C., and a solution of 226 parts of ε-caprolactam in 944 parts of butyl cellosolve was then added dropwise at 80° C. over 2 hours. Further, the mixture was heated at 100° C. for 4 hours, disappearance of an absorption based on an isocyanate group was then confirmed in IR spectrum measurement, the mixture was allowed to cool, and 349 parts of MIBK was then added, affording a blocked isocyanate curing agent (B-2) (solid content: 80%). The isocyanate group value was 251 mg KOH/g.

Production Example 4-1 Production of Resin Emulsion (1)

350 parts (solid content) of the aminated resin (A-1) obtained in Production Example 2-1 was mixed with 75 parts (solid content) of the blocked isocyanate curing agent (B-1) obtained in Production Example 3-1 and 75 parts (solid content) of the blocked isocyanate curing agent (B-2) obtained in Production Example 3-2, and ethylene glycol mono-2-ethylhexyl ether was added in an amount of 3% (15 parts) based on the solid content. Next, the mixture was neutralized by adding formic acid in such a manner that the addition amount corresponded to a resin neutralization ratio of 40%, the mixture was slowly diluted by adding ion-exchanged water, and methyl isobutyl ketone was then removed under a reduced pressure so that the solid content was 40%, thereby affording a resin emulsion (1).

Production Example 4-2 Production of Resin Emulsion (2)

A resin emulsion (2) was obtained in the same manner as in Production Example 4-1 except that 350 parts (solid content) of the aminated resin (A-2) obtained in Production Example 2-2 was used instead of 350 parts (solid content) of the aminated resin (A-1) obtained in Production Example 2-1.

Production Example 5-1 Production of Epoxy Viscosity Agent (D-1)

940 parts of a bisphenol A-type epoxy resin (trade name: DER-331 J, produced by The Dow Chemical Company), 388 parts of bisphenol A, and 2 parts of dimethylbenzylamine were added, and reacted until the epoxy equivalent was 800 g/eq while the inside of a reaction vessel was held at a temperature of 140° C., and cooling was then performed until the temperature of the inside of the reaction vessel was 120° C.

A mixture (amine compound) of 155 parts of diethylenetriamine (methyl isobutyl ketone solution having a solid content of 73%), 43 parts of N-methylethanolamine, and 45 parts of diethylenetriamine (DETA) was then added, and reacted at 120° C. for 1 hour, affording an amine-modified epoxy resin. After cooling to 90° C., the amine-modified epoxy resin was acid-neutralized by adding ion-exchanged water and acetic acid such that the neutralization ratio would be 50%. Then, ion-exchanged water was added to dilute and disperse that to a solid content of 20%. Thereafter, 188 parts of bisphenol A-type epoxy resin (trade name: DER-331J, produced by The Dow Chemical Company) (in an amount of 1.4 mol relative to 1 mol of the ketimine derivative) was added and reacted at 90° C. for 3 hours. Methyl isobutyl ketone was removed under reduced pressure to obtain an epoxy viscosity agent (D-1) having a solid content of 20%.

Water was removed by vacuum drying or the like, and then the number-average molecular weight of the resulting epoxy viscosity agent (D-1) was measured under the following conditions by gel permeation chromatography (GPC) using polystyrene standard samples. The number-average molecular weight of the epoxy viscosity agent (D-1) was 800,000.
Apparatus: alliance 2695 Separations Module
Column: Tosoh TSK gel ALPHA-M
Flow rate: 0.05 ml/min
Detector: alliance 2414 Refractive Index Detector
Mobile phase: N,N'-dimethylformamide
Standard samples: TSK STANDARD POLYSTYRENE (produced by Tosoh Corporation), A-500, A-2500, F-1, F-4, F-20, F-80, F-700, 1-phenylhexane (produced by Aldrich)

The polymerization ratio of the epoxy viscosity agent (D-1) was 40%. In this description, the polymerization ratio of an epoxy viscosity agent was determined in accordance with the following procedure.

The peak area ($N_1$) of the peak corresponding to a molecular weight of 100,000 or more and the peak area ($N_2$) of the peak corresponding to a molecular weight of less than 100,000 of the resulting epoxy viscosity agent (D-1) were determined using number-average molecular weight measurement data measured using GPC, and then a polymerization ratio was calculated from the following equation. If the polymerization ratio is 40% or more, it can be judged that the epoxy viscosity agent has been sufficiently polymerized.

Polymerization ratio (%)=$N_1/(N_1+N_2)$×100

The average particle size of the epoxy viscosity agent (D-1) was measured using a dynamic light scattering type particle size analyzer LB-500 (manufactured by Horiba, Ltd.). The average particle size of the epoxy viscosity agent (D-1) was 30 nm.

Production Example 5-2 Production of Epoxy Viscosity Agent (D-2)

An epoxy viscosity agent (D-2) was produced in the same manner as in Production Example 5-1 except that in the amine modification step, an amine-modified epoxy resin was obtained by adding a mixture of 258 parts of diethylenetriamine (a solution in methyl isobutyl ketone with a solid content of 73%), 21 parts of N-methylethanolamine (MMA) and 45 parts of diethylenetriamine (DETA), and then reacting them at 120° C. for 1 hour.

The number-average molecular weight, the average particle size, and the polymerization ratio of the resulting epoxy viscosity agent (D-2) were measured in the same manner as in Production Example 5-1 and the results were as follows.
Number-average molecular weight: 1,000,000
Average particle size: 30 nm
Polymerization ratio: 80%

Example 1

Production of Lanthanum Paste
60.0 parts of the pigment dispersion resin (solid content: 50% by mass) obtained in Production Example 1 and 100 parts of lanthanum oxide, which was a metal element compound (D), were added to 116.6 parts of ion-exchanged water, followed by stirring at 40° C. and 1800 rpm for 1 hour by using a sand mill, and thus a lanthanum oxide paste was obtained. The resulting lanthanum oxide paste had a solid concentration of 47% by mass.
Production of Pigment Dispersion Paste for Cationic Electrodeposition Coating Composition
Using the pigment-dispersed resin obtained in Production Example 1, a mixture was prepared using a sand mill based on the formulation shown in the following table. Then, the obtained mixture was dispersed at 40° C. to have a volume-average particle diameter D50 of 0.6 μm, and thus a pigment dispersion paste (solid content: 50%) was obtained. As to the measurement of a volume-average particle diameter D50, the volume-average particle diameter D50 was measured with a dispersion diluted with ion-exchanged water such that an appropriate signal level is attained using a laser Doppler type particle size analyzer ("Microtrac UPA150" manufactured by Nikkiso Co., Ltd.).

TABLE 1

| | |
|---|---|
| Pigment dispersion resin of Production Example 1 | 61.6 |

TABLE 1-continued

| | |
|---|---|
| Lanthanum paste | 4.3 |
| Carbon black | 5 |
| Dioctyl tin oxide | 16 |
| Calcined kaolin | 95 |
| DIW | 118 |

* DIW: Ion-exchanged water

To a stainless steel container were added 1997 parts of ion-exchanged water, 1539 parts of the resin emulsion (1) of Production Example 4-1, 464 parts of the pigment dispersion paste prepared above, and 195 parts (an amount of 6% by mass as a resin solid content relative to the total of the resin solid content of the resin emulsion and the resin solid content of the epoxy viscosity agent) of the epoxy viscosity agent (D-1) obtained in Production Example 5-1, which were then mixed and aged at 40° C. for 16 hours, and thus a cationic electrodeposition coating composition was obtained.

Example 2

A cationic electrodeposition coating composition was constituted in the same manner as in Example 1 except that the amount of the lanthanum oxide paste was changed from 4.3 parts to 17.2 parts.

Example 3

A cationic electrodeposition coating composition was constituted in the same manner as in Example 1 except that the amount of the lanthanum oxide paste was changed from 4.3 parts to 34.4 parts.

Example 4

A pigment dispersion paste was prepared in the same manner as in Example 1 except that the amount of the lanthanum oxide paste was changed from 4.3 parts to 17.2 parts.

To a stainless steel container were added 1997 parts of ion-exchanged water, 1539 parts of the resin emulsion (2) of Production Example 4-2, 464 parts of the pigment dispersion paste prepared above, and 195 parts (an amount of 6% by mass as a resin solid content relative to the total of the resin solid content of the resin emulsion and the resin solid content of the epoxy viscosity agent) of the epoxy viscosity agent (D-1) obtained in Production Example 5-1, which were then mixed and aged at 40° C. for 16 hours, and thus a cationic electrodeposition coating composition was obtained.

Example 5

60.0 parts of the pigment dispersion resin (solid content: 50% by mass) obtained in Production Example 1 and 100 parts of neodymium oxide, which was a metal element compound (D), were added to 116.6 parts of ion-exchanged water, followed by stirring at 40° C. and 1800 rpm for 1 hour by using a sand mill, and thus a neodymium oxide paste was obtained. The resulting neodymium oxide paste had a solid concentration of 47% by mass.

A cationic electrodeposition coating composition was constituted in the same manner as in Example 1 except that 4.3 parts of the lanthanum oxide paste of Example 1 was changed to 17.2 parts of a neodymium oxide paste.

Example 6

An yttrium oxide paste was prepared in the same manner as in Example 5 except that yttrium oxide was used instead of 100 parts of neodymium oxide. Using this, a pigment paste was prepared in the same manner as in Example 5, and thus a cationic electrodeposition coating composition was obtained.

Example 7

A bismuth oxide paste was prepared in the same manner as in Example 5 except that bismuth oxide was used instead of 100 parts of neodymium oxide. Using this, a pigment paste was prepared in the same manner as in Example 5, and thus a cationic electrodeposition coating composition was obtained.

Example 8

A zinc oxide paste was prepared in the same manner as in Example 5 except that zinc oxide was used instead of 100 parts of neodymium oxide. Using this, a pigment paste was prepared in the same manner as in Example 5, and thus a cationic electrodeposition coating composition was obtained.

Example 9

A cationic electrodeposition coating composition was obtained in the same manner as in Example 2 except that 195 parts of the epoxy viscosity agent (D-2) obtained in Production Example 5-2 was used instead of 195 parts of the epoxy viscosity agent (D-1) obtained in Production Example 5-1.

Example 10

A cationic electrodeposition coating composition was prepared by adding an aqueous solution of calcium nitrite (concentration: 30% by mass, calcium nitrite: produced by Nissan Chemical Corporation) in such an amount that its concentration in the electrodeposition coating composition would be 400 ppm (0.04% by mass) in terms of metal element to a cationic electrodeposition coating composition before aging prepared in the same manner as in Example 2, and then performing aging at 40° C. for 16 hours.

Comparative Example 1

A pigment dispersion paste was prepared in the same manner as in Example 1 except that the amount of the lanthanum oxide paste was changed from 4.3 parts to 17.2 parts.

In a stainless steel container, 2095 parts of ion-exchanged water, 1637 parts of the resin emulsion (1) of Production Example 4-1, and 464 parts of the pigment paste prepared above were added and mixed, and then aged at 40° C. for 16 hours, and thus a cationic electrodeposition coating composition was obtained.

Comparative Example 2

A cationic electrodeposition coating composition was constituted in the same manner as in Example 2 except that the amount of the lanthanum oxide paste was changed from 17.2 parts to 1.72 parts.

Comparative Example 3

A cationic electrodeposition coating composition was obtained in the same manner as in Example 2 except that the amount of the lanthanum oxide paste was changed from 17.2 parts to 0 parts and that 195 parts of the epoxy viscosity agent (D-2) obtained in Production Example 5-2 was used instead of 195 parts of the epoxy viscosity agent (D-1) obtained in Production Example 5-1.

The following evaluations were carried out using the cationic electrodeposition coating compositions obtained by Examples and Comparative Examples. The results of the evaluations are shown in the following table.

Formation of Cured Electrodeposition Coating Film

A cold-rolled steel sheet (JIS G 3141, SPCC-SD) was immersed in SURFCLEANER EC90 (produced by Nippon Paint Surf Chemicals Co., Ltd.) at 50° C. for 2 minutes, thereby being degreased. Next, the steel sheet was immersed in SURFFINE GL1 (produced by Nippon Paint Surf Chemicals Co., Ltd.) at room temperature for 30 seconds, and immersed in SURFDYNE EC3200 (produced by Nippon Paint Surfchemicals, Zirconium conversion agent) at 35° C. for 2 minutes. The steel sheet was then rinsed with deionized water.

To the cationic electrodeposition coating composition obtained above, a required amount of 2-ethylhexyl glycol was added such that the electrodeposition coating film had a thickness of 20 μm after curing.

Thereafter, the steel sheet was fully embedded in the electrodeposition coating composition, and application of a voltage was then immediately started. The voltage was applied under such a condition that the voltage was raised for 30 seconds to 180 V, and the steel sheet was held for 150 seconds. Thus, an uncured electrodeposition coating film was deposited on the object to be coated (cold-rolled steel sheet). The resulting uncured electrodeposition coating film was heated and cured at 160° C. for 15 minutes, affording an electrodeposition coated sheet having a cured electrodeposition coating film having a thickness of 20 μm.

Evaluation of Coating Film Appearance of Cured Electrodeposition Coating Film

The surface roughness of the obtained cured electrodeposition coating film was found by measuring the arithmetic average roughness (Ra) of a roughness curve according to JIS B0601 by using an Evaluation type Surface Roughness Measurement Instrument (SURFTEST SJ-201P, manufactured by Mitutoyo Co., Ltd.). A sample with 2.5-mm-width cut-off (number of partitions: 5) was subjected to measurement seven times to give Ra values in terms of top/bottom-trimmed mean. It may be said that a smaller Ra value leads to less surface irregularities and a better coating film appearance.

Evaluation of Edge Part Rust Prevention Property

Degreasing treatment, surface treatment, and chemical conversion were performed in the same procedures as described above, except that the object to be coated was changed from a cold-rolled steel sheet (JIS G3141, SPCC-SD) to an L-type exclusive spare blade (LB10K: manufactured by OLFA Corporation, length: 100 mm, width: 18 mm, thickness: 0.5 mm).

Subsequently, a cured electrodeposition coating film was provided in the same procedure as in the formation of the cured electrodeposition coating film (1) and thus a cured electrodeposition coating film having a thickness of 20 μm was provided on the object to be coated having an edge part (an L-type exclusive spare blade), and thus a test piece was obtained.

The test piece was subjected to a salt water spray test (35° C.×72 hours) in accordance with JIS Z2371 (2000), and the number of rust colonies formed at a tip of the L-type exclusive spare blade was examined.

In this test, "a tip of an L-type exclusive spare blade" means a width of 5 mm from the top of the blade along the blade body direction. The width includes both the front surface side and the back surface side, and the front and back surfaces have a width of 10 mm in total. The "tip of an L-type exclusive spare blade" corresponds to the "edge part" referred to herein.

For example, in the following evaluation, when the number of rust colonies formed at the tip of the L-type exclusive spare blade is 30, since the length of the L-type exclusive spare blade is 100 mm (10 cm), the width of the tip of the L-type exclusive spare blade is 10 mm in total (1 cm in width) on the front and back surfaces, the number of rust colonies per 1 $cm^2$ of the tip of the L-type exclusive blade is, 30 colonies/10 $cm^2$=3 colonies/$cm^2$. In the following evaluation criteria, those with ○Δ or more are regarded as pass.

Evaluation Criteria

⊙: No rust was formed.

○: Less than 10 rust colonies.

(In terms of the number of rust colonies per 1 $cm^2$ of a tip of an L-type exclusive spare blade, less than 1 colony/$cm^2$.)

○Δ: 10 or more rust colonies and less than 30 rust colonies, (In terms of the number of rust colonies per 1 $cm^2$ of a tip of an L-type exclusive spare blade, 1 or more colonies/$cm^2$ and less than 3 colonies/$cm^2$.)

Δ: 30 or more rust colonies and less than 50 rust colonies, (In terms of the number of rust colonies per 1 $cm^2$ of a tip of an L-type exclusive spare blade, 3 or more colonies/$cm^2$ and less than 5 colonies/$cm^2$.)

Δ×: 50 or more rust colonies and less than 100 rust colonies.

(In terms of the number of rust colonies per 1 $cm^2$ of a tip of an L-type exclusive spare blade, 5 or more colonies/$cm^2$ and less than 10 colonies/$cm^2$.)

×: 100 or more rust colonies.

(In terms of the number of rust colonies per 1 $cm^2$ of a tip of an L-type exclusive spare blade, 10 or more colonies/$cm^2$.)

Measurement of Coating Film Viscosity at 110° C.

An object to be coated (tin plated steel plate) was immersed in a cationic electrodeposition coating composition and electrodeposition coating was carried out for 180 seconds such that a coating film having a thickness of about 15 μm would be formed, and thus an uncured electrodeposition coating film was formed. This was washed with water and the excessively adhering electrodeposition coating composition was removed. Subsequently, excessive moisture adhering to the surface of the electrodeposition coating film was removed, and then the coating film was peeled off from the coated plated without drying. The sample thus obtained was subjected to measurement of a coating film viscosity at 110° C. by measuring a viscosity at a basic frequency of 1 Hz and a strain control of 0.5 deg using a dynamic viscoelasticity measuring device (trade name: Rheosol-G3000, manufactured by UBM Co., Ltd.).

Measurement of the Amount of Metal Element Compound (C) in a Portion Resulting from the Removal of Resin Components from Deposited Electrodeposition Coating Film An electrodeposition coating film was formed by performing electrodeposition coating for 180 seconds on an object to be coated such that the resulting film comes to have a thickness of about 15 μm, and then the film was washed with water to remove an electrodeposition coating composition that had excessively adhered. Subsequently, after removing excessive moisture adhering to the surface of the electrodeposition coating film, resin components of the coating film were dissolved and removed using a solvent such as tetrahydrofuran (THF). Thus, the amount of the metal element compound (C) (in terms of metal element) was measured by measuring the amount of the metal element compound (C) in the portion resulting from the removal of the resin components from a deposited electrodeposition coating film by fluorescent X-ray analysis.

Measurement of Polarity Term

An electrodeposition coating film was formed by performing electrodeposition coating for 180 seconds on an object to be coated such that the resulting film comes to have a thickness of about 15 μm, and then the film was washed with water to remove an electrodeposition coating composition that had excessively adhered. Subsequently, after removing excessive moisture adhering to the surface of the electrodeposition coating film, only the coating film was dissolved and removed using a solvent (tetrahydrofuran (THF)). The polarity term of the portion resulting for the removal of the resin compositions from the deposited electrodeposition coating film of the cationic electrodeposition coating composition was calculated by measuring the contact angles of the portion resulting from the removal of the resin components with respect to water and methylene iodide.

TABLE 2

|  |  | Example 1 | Example 2 | Example 3 | Example 4 | Example 5 | Example 6 | Example 7 |
|---|---|---|---|---|---|---|---|---|
| Metal element compound (C) (%) | La | 0.025 | 0.1 | 0.2 | 0.1 |  |  |  |
|  | Nd |  |  |  |  | 0.1 |  |  |
|  | Y |  |  |  |  |  | 0.1 |  |
|  | Bi |  |  |  |  |  |  | 0.1 |
|  | Zn |  |  |  |  |  |  |  |
| Metal nitrite (E) |  |  |  |  |  |  |  |  |
| Aminated resin (A) | (A-1) | ○ | ○ | ○ |  | ○ | ○ | ○ |
|  | (A-2) |  |  |  | ○ |  |  |  |
| Epoxy viscosity agent (D) | (D-1) | ○ | ○ | ○ | ○ | ○ | ○ | ○ |
|  | (D-2) |  |  |  |  |  |  |  |
| Polarity term (mN/m) |  | 5 | 10 | 20 | 10 | 6 | 6 | 3 |
| Coating film viscosity (mPa · s) at 110° C. |  | 10000 | 10000 | 10000 | 10000 | 10000 | 10000 | 20000 |
| Amount (mg/m$^2$) of metal element compound (C) of deposited electrodeposition coating film |  | 1.2 | 8.7 | 20 | 9 | 4 | 3.5 | 1 |
| Evaluation | Coating film appearance | 0.2 | 0.2 | 0.2 | 0.2 | 0.3 | 0.3 | 0.26 |
|  | Edge rust prevention property | ○Δ | ○ | ⊙ | ⊙ | ○Δ | ○Δ | ○Δ |

|  |  | Example 8 | Example 9 | Example 10 | Comparative Example 1 | Comparative Example 2 | Comparative Example 3 |
|---|---|---|---|---|---|---|---|
| Metal element compound (C) (%) | La |  | 0.1 | 0.1 | 0.1 | 0.01 | 0 |
|  | Nd |  |  |  |  |  |  |
|  | Y |  |  |  |  |  |  |
|  | Bi |  |  |  |  |  |  |
|  | Zn | 0.1 |  |  |  |  |  |
| Metal nitrite (E) |  |  |  | 0.04 |  |  |  |
| Aminated resin (A) | (A-1) | ○ | ○ | ○ | ○ | ○ | ○ |
|  | (A-2) |  |  |  |  |  |  |
| Epoxy viscosity agent (D) | (D-1) | ○ |  | ○ |  | ○ |  |
|  | (D-2) |  | ○ |  | ○ |  | ○ |
| Polarity term (mN/m) |  | 4 | 10 | 3 | 10 | 1 | 0.5 |
| Coating film viscosity (mPa · s) at 110° C. |  | 20000 | 200000 | 10000 | 3000 | 10000 | 200000 |
| Amount (mg/m$^2$) of metal element compound (C) of deposited electrodeposition coating film |  | 2 | 8 | 8.7 | 8 | 0.8 | 0 |
| Evaluation | Coating film appearance | 0.38 | 0.29 | 0.2 | 0.18 | 0.2 | 0.29 |
|  | Edge rust prevention property | ○Δ | ⊙ | ○Δ | Δ | x | Δx |

In all the cases of using the cationic electrodeposition coating compositions of the examples, a good edge part rust prevention property and good coating film appearance were obtained.

In Comparative Example 1, the coating film viscosity at 110° C. is less than 5000 mPa·s. In this case, the edge part rust prevention performance was poor.

In Comparative Examples 2 and 3, the polarity term of the portion resulting from the removal of resin components from the deposited electrodeposition coating film is less than 2 mN/m. Also in this case, the edge part rust prevention performance was poor.

INDUSTRIAL APPLICABILITY

It is possible to form a cured electrodeposition coating film being superior in rust prevention properties, especially, an edge part rust prevention property, and having a superior coating film appearance by performing electrodeposition coating using a cationic electrodeposition coating composition of the present invention.

The invention claimed is:

1. A cationic electrodeposition coating composition comprising:
a resin emulsion containing an aminated resin (A) and a blocked isocyanate curing agent (B), and
an epoxy viscosity agent (D),
wherein,
a deposited electrodeposition coating film of the cationic electrodeposition coating composition has a coating film viscosity in a range of 5,000 to 1,000,000 mPa·s 110° C.,
a portion resulting from removal of a resin component from the deposited electrodeposition coating film of the cationic electrodeposition coating composition has a polarity term in a range of 2 to 30 mN/m, and
the epoxy viscosity agent (D) has an average particle size of 1 to 200 nm and a number-average molecular weight in a range of 100,000 to 10,000,000, and the epoxy viscosity agent (D) has amino groups, in which 30 to 100% of the amino groups is neutralized with acetic acid.

2. The cationic electrodeposition coating composition according to claim 1, further comprising at least one metal element compound (C) selected from the group consisting of a Group 3 element compound, a zinc compound, and a bismuth compound,
wherein a content of the metal element compound (C) contained in the cationic electrodeposition coating composition is in a range of 0.02 to 1% by mass in terms of metal element.

3. The cationic electrodeposition coating composition according to claim 2, wherein an amount of the metal element compound (C) in the portion resulting from the removal of the resin component from the cationic electrodeposition coating composition from the deposited electrodeposition coating film of the cationic electrodeposition coating composition is in a range of 1 to 100 mg/m² in terms of metal element.

4. The cationic electrodeposition coating composition according to claim 1, wherein a hydroxyl value of the aminated resin (A) is 150 to 400 mg KOH/g.

5. The cationic electrodeposition coating composition according to claim 1,
wherein an amount of the epoxy viscosity agent (D) contained in the cationic electrodeposition coating composition is 0.1 to 15 parts by mass in terms of resin solid content relative to 100 parts by mass of a total of a resin solid content of the resin emulsion and a resin solid content of the epoxy viscosity agent (D).

6. The cationic electrodeposition coating composition according to claim 1, further comprising a metal nitrite (E).

7. A method for forming a cured electrodeposition coating film, the method comprising a step of performing electrodeposition coating by immersing an object to be coated in the cationic electrodeposition coating composition according to claim 1, and then forming a cured electrodeposition coating film on the object to be coated by performing heating and curing.

8. The method according to claim 7, wherein the object to be coated has an edge part, and in an event that the object to be coated having the cured electrodeposition coating film formed has been subjected to a salt water spray test, a number of rust colonies formed per 1 cm² of a coated edge part is less than 3 colonies/cm².

* * * * *